United States Patent [19]

Clements

[11] 4,454,938
[45] Jun. 19, 1984

[54] ROTARY HIGH POWER TRANSMISSION ARRANGEMENT

[75] Inventor: Herbert A. Clements, Woking, England

[73] Assignee: S. S. S. Patents Limited, Middlesex, England

[21] Appl. No.: 351,742

[22] Filed: Feb. 24, 1982

[30] Foreign Application Priority Data

Mar. 3, 1981 [GB] United Kingdom ............... 8106690

[51] Int. Cl.³ .................. F16D 23/06; F16D 23/08
[52] U.S. Cl. ......................... 192/67 A; 192/53 R; 192/114 T
[58] Field of Search ............... 192/67 A, 53 E, 53 F, 192/53 G, 53 H, 53 R, 114 T

[56] References Cited

FOREIGN PATENT DOCUMENTS 224986 9/1923 United Kingdom .
1136138 7/1967 United Kingdom .
1291773 3/1970 United Kingdom .
1241362 8/1971 United Kingdom .

Primary Examiner—Rodney H. Bonck
Attorney, Agent, or Firm—Woodcock, Washburn, Kurtz, Mackiewicz & Norris

[57] ABSTRACT

A toothed clutch is arranged between a first rotary clutch part and an intermediate part connected by straight splines to a second rotary clutch part. If engagement of the toothed clutch is attempted while the rotary clutch parts are in relative rotation in one direction, blocking members frictionally engaged with the intermediate member slide along surfaces, inclined to the axis of rotation, of baulking members carried by the first rotary clutch part and engage baulking abutments, whereby engagement of the toothed clutch is baulked. When the first and second rotary clutch parts are brought to rotational synchronism, e.g. by engagement of a friction clutch, movement of the intermediate part to engage the toothed clutch is accompanied by movement of the blocking members away from the inclined surfaces of the baulking members and clear of the baulking abutments.

5 Claims, 4 Drawing Figures

ROTARY HIGH POWER TRANSMISSION ARRANGEMENT

BACKGROUND OF THE INVENTION

This invention relates to a high power transmission arrangement comprising an engageable and disengageable toothed clutch.

Damage may be caused if an attempt is made to engage the toothed clutch whilst the rotary clutch parts thereof are in relative rotation, and it has therefore been usual hitherto to provide speed sensing devices for indicating that the rotary clutch parts are in rotational synchronism and that the toothed clutch is prepared for engagement. The object of the present invention is to avoid the need for such sensing devices.

In our British Patent Specification No. 1,291,773 there is disclosed a pawl and ratchet mechanism which may be operated in both a ratcheting and a pawl free condition in which the pawl and ratchet components of the mechanism are respectively in and out of engagement with each other, the mechanism having a movable baulking member which when in a baulking position prevents relative movement of the said components into the ratcheting condition, the baulking member being maintained in said baulking position when the relative rotation of the said components is inappropriate to permit the mechanism to be operated in the ratcheting condition, and movement imparting means for moving the baulking member out of the baulking position when the said relative rotation is appropriate. The baulking member is provided with stepped baulking teeth which, when the baulking member is in the baulking position, are in effect locked in engagement with blocking teeth on a blocking ring, such locking of the teeth together being desirable to prevent their separation as a result of vibration. When, however, the relative rotation of the pawl and ratchet components is appropriate to permit movement of the baulking member out of the baulking position, there is only a small frictional force between the blocking ring and a bearing therefor which tends to effect such movement of the baulking member out of the baulking position. Consequently it has previously been necessary to constantly try to move the baulking member manually out of the baulking position and this could involve a considerable amount of operator time.

BRIEF DESCRIPTION OF THE INVENTION

According, therefore, to the present invention there is provided a rotary high power transmission arrangement comprising a toothed clutch which includes a first rotary clutch part carrying a ring of clutch teeth and a second rotary clutch part carrying an intermediate part, a portion of the intermediate part carrying a ring of clutch teeth and being movable relative to the second rotary clutch part to bring the clutch teeth carried by the said portion into and out of interengagement with the clutch teeth carried by the first rotary clutch part, the arrangement further comprising a baulking mechanism which obstructs movement of the intermediate part in the clutch-engaging direction when the first and second rotary clutch parts are in relative rotation in at least one direction, the baulking mechanism comprising baulking members carried by one of the two parts comprising the first rotary clutch part and the intermediate part, and blocking members carried by the other of the said two parts and rotatable with light friction relative to the latter, the baulking members having surfaces against which the blocking members abut when the first and second rotary clutch parts are in relative rotation in at least one direction and having baulking abutments against which the blocking members abut if an attempt is made to engage the toothed clutch whilst the first and second rotary clutch parts are in relative rotation in at least the said one direction, characterised in that the said surfaces are inclined relative to the direction of motion of the intermediate part with respect to the second rotary clutch parts between positions corresponding to the engaged and disengaged conditions of the toothed clutch such that, when the first and second rotary clutch parts are brought to rotational synchronism, the toothed clutch can be engaged since the movement of the intermediate part in the clutch-engaging direction is accompanied by movement of the blocking members away from the said surfaces and clear of the said baulking abutments.

Preferably, the baulking mechanism, in addition to comprising the first-mentioned surfaces and the first-mentioned baulking abutments, also comprises second surfaces against which the blocking members abut when the first and second rotary clutch parts are in relative rotation in the other direction, and second baulking abutments against which the blocking members abut if an attempt is made to engage the toothed clutch whilst the first and second rotary clutch parts are in relative rotation in the said other direction.

Preferably, the said second surfaces are inclined to the direction of motion of the intermediate part relative to the second rotary clutch part between positions corresponding to the engagement and disengagement of the toothed clutch such that, when the first and second rotary clutch parts are brought to rotational synchronism with the blocking members abutting the said second surfaces, the toothed clutch can be engaged since the movement of the intermediate part in the clutch-engaging direction is accompanied by movement of the blocking members away from the said second surfaces and clear of the said second baulking abutments.

The intermediate part may comprise an intermediate member which carries the blocking members or baulking members and which is helically splined to a carrier carrying the respective clutch teeth, there being means for urging the carrier member axially away from the intermediate member. The intermediate member is preferably axially splined to the second rotary clutch part.

BRIEF DESCRIPTION OF THE DRAWINGS

Embodiments of the invention are illustrated by way of example in the accompanying drawing, in which.

DETAILED DESCRIPTION OF THE PREFERRED EMBODIMENTS

Figure 1:
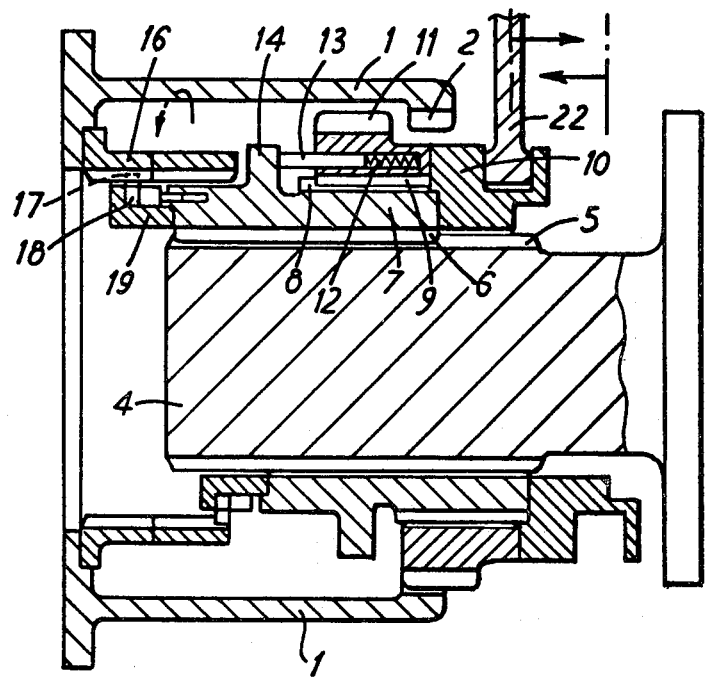
FIG. 1 is a view in longitudinal section of a rotary high power transmission arrangement in accordance with the invention, the upper half of the figure showing a toothed clutch in a disengaged condition and the lower half showing the toothed clutch in an engaged condition.
Figure 2:
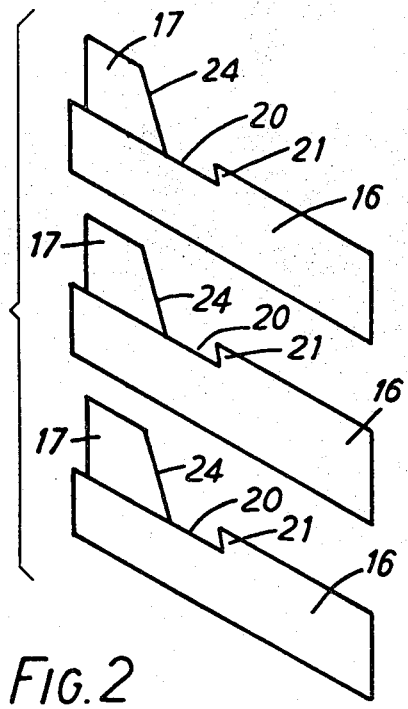
FIGS. 2, 3 and 4 are development views of blocking and baulking members which form part of the said rotary high power transmission arrangement and which are in accordance respectively with a first, second and third embodiment of the invention.

Referring first to FIGS. 1 and 2 of the drawings, the power transmission arrangement illustrated includes a first rotary clutch part comprising a sleeve 1 carrying a ring of internal clutch teeth 2. A second rotary clutch part comprises a shaft 4 formed with straight external axial splines 5 with which engage straight internal axial splines 6 in a sleeve 7 constituting an intermediate member. The intermediate member 7 is formed with external helical splines 8 with which engage internal helical splines 9 in a carrier 10 formed with a ring of external clutch teeth 11. The intermediate member 7 and the carrier 10 collectively constitute an intermediate part which is movable relative to the second rotary clutch part 4 to bring the clutch teeth 11 carried by the carrier 10 into and out of engagement with the clutch teeth 2 carried by the first rotary clutch part 1. The carrier 10 contains springs 12 which, through the intermediary of rods 13, exert a light axial force on a flange 14 on the intermediate member 7.

A baulking mechanism is provided which comprises baulking members 16 which are carried by the first rotary clutch part 1, and blocking members 17 which are carried by the intermediate member 7, the blocking members 17 being formed on a ring 18 which is carried by a bearing 19 mounted on the intermediate member 7, with slight friction between the ring 18 and the bearing 19. The surfaces 20 of the baulking members 16 are inclined to the splines 5 and are formed with steps 21 (FIG. 2) constituting baulking abutments. The surfaces 20 are thus inclined relative to the direction of motion of the intermediate part 7, 10 with respect to the second rotary clutch part 4 between positions corresponding to the engaged and disengaged conditions of the toothed clutch.

A control fork 22 operated by a control cylinder (not shown) through the intermediary of the spring link (not shown) engages in a groove in the carrier 10.

In operation, assuming that the first rotary clutch part 1 is rotating in the direction of the arrow and that the second rotary clutch part 4 is stationary, the baulking members 16 are urged against the blocking members 17, the baulking and blocking members having the relative positions shown in FIG. 2 with the blocking members 17 spaced axially from the baulking abutments 21.

If now an attempt is made to engage the toothed clutch by operation of the control fork 22 to shift the carrier 10 and intermediate member 7 in the clutch-engaging direction (to the right in FIG. 1), such movement is obstructed because the blocking members 17, sliding along the surfaces 20 of the baulking members 16, abut at their surfaces 24 against the baulking abutments 21.

When the toothed clutch is to be engaged, the rotary clutch parts are brought to rotational synchronism, e.g. by engagement of a friction clutch (not shown). The blocking members 17 are still in the positions shown in FIG. 2 relative to the baulking members 16. The control fork 22 is then actuated to urge the carrier 10 and intermediate member 7 in the clutch-engaging direction. Movement of the intermediate member 7 in the clutch-engaging direction is now permitted by the baulking mechanism since such movement is accompanied by movement of the blocking members 17 away from the baulking members 16 and clear of the baulking abutments 21, due to the surfaces 20 being at an angle relative to the clutch-engaging motion of the intermediate member 7 along the splines 5.

Movement of the carrier 10 in the clutch-engaging direction will probably not result in immediate engagement of the toothed clutch since in general the clutch teeth 11 will not, at this stage, be opposite the gaps between the clutch teeth 2 and will bear against the ends of these teeth. However, the displacement of the carrier 10, and consequently of the intermediate member 7, in the clutch-engaging direction will, under these conditions, compress the springs 12, and at the same time the effect of the interengaged helical splines 8 and 9 will be such that the carrier 10 is rotated relative to the intermediate member 7 until the clutch teeth 11 come opposite the gaps between the clutch teeth 2, whereupon the clutch teeth 11 snap into interengagement with the clutch teeth 2.

Figure 3:
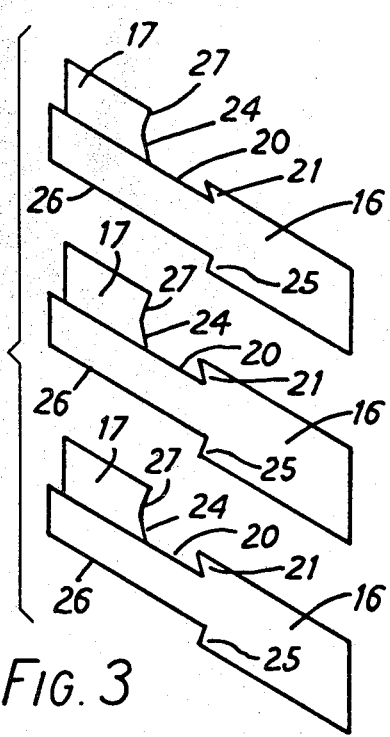

In the embodiment of the invention illustrated in FIG. 3, in addition to the baulking abutments 21 which are provided by the steps on the surfaces 20 of the baulking members 16 as described with reference to FIG. 2 and which are engaged by the surfaces 24 of the blocking members 17 when the baulking mechanism is effective, further baulking abutments are provided by steps 25 on the surfaces 26 of the baulking members 16, so that movement of the intermediate member 7 in the clutch-engaging direction is baulked by the engagement of surfaces 27 of the blocking members 17 with the baulking abutments 25 if an attempt is made to engage the toothed clutch whilst the first rotary clutch part 1 is in rotation relative to the second rotary clutch part 4 in the direction opposite to the direction indicated by the arrow in FIG. 1. With this arrangement, however, owing to the direction of indication of the surfaces 26 of the baulking members 16, an attempt to engage the toothed clutch when the rotary clutch parts are in rotational sychronism will not result in the blocking members 17 moving away from the surfaces 26 and clear of the further baulking abutments 25, and in order to engage the toothed clutch when the rotary clutch parts have been brought to rotational synchronism with the blocking members 17 in contact with the surfaces 26 of the baulking members 16 it will first be necessary to adjust the relative rotational positions of the first and second rotary clutch parts, e.g. by hand, to bring the blocking members 17 away from the surfaces 26 to positions in which they can clear the further baulking abutments 25.

Figure 4:
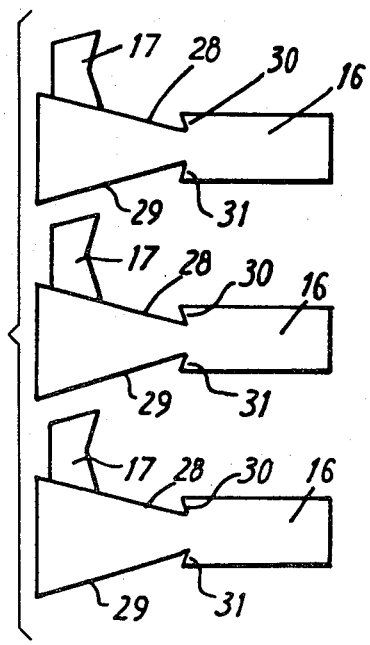

In the embodiment of the invention illustrated in FIG. 4 the two inclined surfaces 28 and 29 of the baulking members 16 are both stepped to provide baulking abutments 30 and 31 respectively, and are both inclined to the direction of movement of the intermediate member 7 at angles which are such that engagement of the toothed clutch is baulked when there is relative rotation between the rotary clutch parts in either direction, whereas when the rotary clutch parts are brought to rotational synchronism from either direction of relative rotation the toothed clutch can be engaged since movement of the intermediate member 7 in the clutch-engaging direction will be accompanied by movement of the blocking members 17 away from the surfaces 28 or 29 as the case may be and clear of the baulking abutments 30 or 31.

Although in the embodiments described above the baulking members 16 and blocking members 17 are carried by the first rotary clutch part 1 and the intermediate member 7 respectively, the arrangement can if desired be such that the baulking members 16 and blocking members 17 are carried by the intermediate member 7 and the first rotary clutch part 1 respectively, the blocking members 17 being rotatable with light friction relative to the first rotary clutch part 1.

I claim:

1. A rotary high power transmission arrangement comprising a toothed clutch which includes a first rotary clutch part carrying a ring of clutch teeth and a second rotary clutch part carrying an intermediate part, a portion of the intermediate part carrying a ring of clutch teeth and being movable relative to the second rotary clutch part to bring the clutch teeth carried by the said portion into and out of interengagement with the clutch teeth carried by the first rotary clutch part, the arrangement further comprising a baulking mechanism which obstructs movement of the intermediate part in the clutch-engaging direction when the first and second rotary clutch parts are in relative rotation in at least one direction, the baulking mechanism comprising baulking members carried by one of the two parts comprising the first rotary clutch part and the intermediate part and blocking members carried by the other of the said two parts and rotatable with light friction relative to the latter, the baulking members having surfaces against which the blocking members abut when the first and second rotary clutch parts are in relative rotation in at least one direction and having baulking abutments against which the blocking members abut if an attempt is made to engage the toothed clutch whilst the first and second rotary clutch parts are in relative rotation in at least the said one direction, the said surfaces being inclined relative to the direction of motion of the intermediate part with respect to the second rotary clutch part between positions corresponding to the engaged and disengaged conditions of the toothed clutch such that, when the first and second rotary clutch parts are brought to rotational synchronism, the toothed clutch is engageable since the movement of the intermediate part in the clutch-engaging direction is accompanied by movement of the blocking members away from the said surfaces and clear of the said baulking abutments.

2. A rotary high power transmission arrangement according to claim 1 in which the baulking mechanism, in addition to comprising the first-mentioned surfaces and the first-mentioned baulking abutments, also comprises second surfaces against which the blocking members abut when the first and second rotary clutch parts are in relative rotation in the other direction, and second baulking abutments against which the blocking members abut if an attempt is made to engage the toothed clutch which the first and second rotary clutch parts are in relative rotation in the said other direction.

3. A rotary high power transmission arrangement according to claim 2 in which the said second surfaces are inclined to the direction of motion of the intermediate part relative to the second rotary clutch part between positions corresponding to the engagement and disengagement of the toothed clutch so that, when the first and second rotary clutch parts are brought to rotational synchronism with the blocking members, abutting the said second surfaces, the toothed clutch is engageable since the movement of the intermediate part in the clutch-engaging direction is accompanied by movement of the blocking members away from the said second surfaces and clear of the said second baulking abutments.

4. A rotary high power transmission arrangement according to claim 1 in which the intermediate part comprises an intermediate member which carries a part of the baulking mechanism and which is helically splined to a carrier carrying the respective clutch teeth, there being means for urging the carrier member axially away from the intermediate member.

5. A rotary high power transmission arrangement according to claim 4 in which the intermediate member is axially splined to the second rotary clutch part.

* * * * *